W. E. WENNER.
TIRE SHIELD.
APPLICATION FILED AUG. 19, 1916.
1,310,315.
Patented July 15, 1919.
2 SHEETS—SHEET 2.
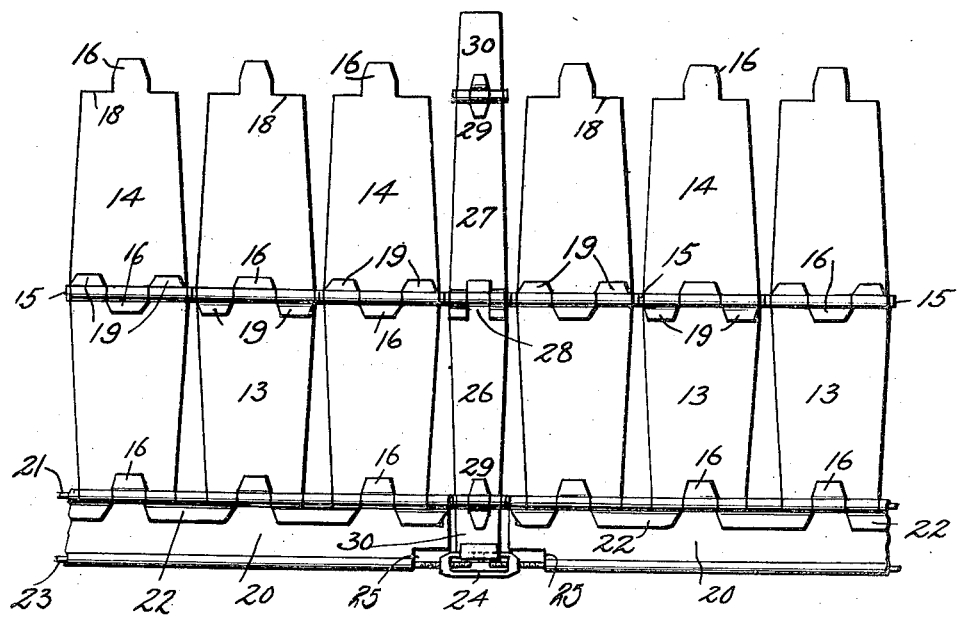
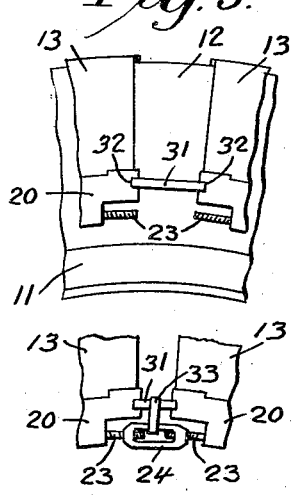
Witness
W. C. Fielding
A. P. Hollingsworth
Inventor
Wesley E. Wenner
By Richard B. Owen.
Attorney

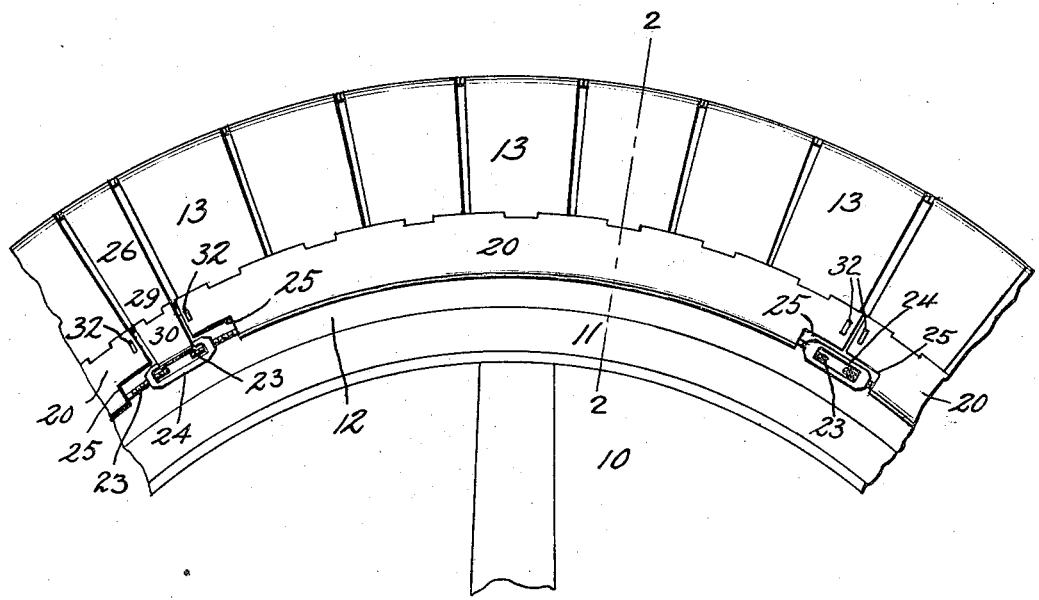
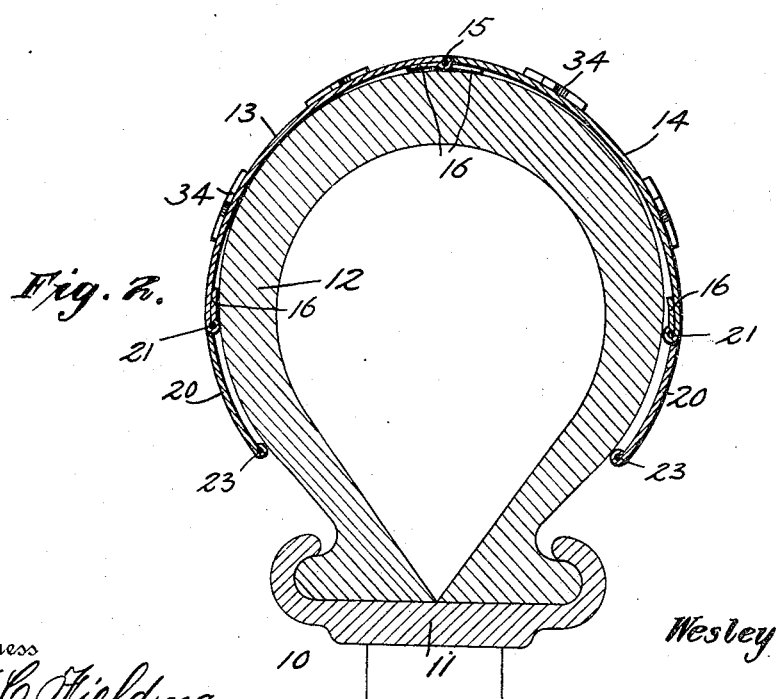

UNITED STATES PATENT OFFICE.

WESLEY E. WENNER, OF STONE CHURCH, PENNSYLVANIA.

TIRE-SHIELD.

1,310,315.  Specification of Letters Patent.  Patented July 15, 1919.

Application filed August 19, 1916. Serial No. 115,835.

*To all whom it may concern:*

Be it known that I, WESLEY E. WENNER, a citizen of the United States, residing at Stone Church, in the county of Northampton and State of Pennsylvania, have invented certain new and useful Improvements in Tire-Shields, of which the following is a specification.

This invention relates to tire protectors and is designed to provide a shield for application to automobile and other rubber tires to protect them from undue injury while traveling along the road, to prevent skidding and to lengthen the life of a tire by preventing its contact more or less with the ground.

The primary object of the invention is to provide a tire protecting shield flexibly connected together and designed for adjustable attachment over and around the tread surface of an automobile tire to protect the tire from undue wear; prevent cutting of the tire when traveling over rough roads and roads containing more or less ice in winter; serve as a shield for worn tires; to provide an anti-skid cover for the tire and for other purposes to which a tire protecting cover can be used.

Another object of the invention is to provide a tire shield made of a plurality of thin flexible sheet metal plates pivotally connected in pairs transversely of the tire and placed in close relation around the tread surface of the tire, the ends of said plates opposite the pivotally connected ends being pivotally connected in turn to curve side shields concentric with and close to the felly of the wheel, said shields being made of sheet metal and in sections connected together at their ends by adjusting devices which draw the protecting shields of the tire closely about the tire.

A further object of the invention is directed to the provision of a filling plate to be inserted between certain of the pairs of tread plates when, owing to the difference in sizes of tires, a greater or less space is formed between the coupled ends of the shield sections.

With these as the principal objects in view and other objects to be pointed out more in detail hereinafter, the invention consists of the novel construction, combination and arrangement of parts now to be described, pointed out in the claims and illustrated in the accompanying drawings in which:

Figure 1 is a side elevation of a portion of an automobile wheel and tire with the protective shield in position for use applied thereto.

Fig. 2 is a vertical cross sectional view of the same on the line 2—2.

Fig. 3 is an inside view of a portion of the protective shield, certain parts being removed therefrom.

Fig. 4 is a perspective view of a blank from which one of the tread plates is made.

Fig. 5 is a detail view showing a modified connection between the shield sections, and, Fig. 6 is a similar view of a further modification.

In the drawings, 10 indicates a portion of an automobile wheel of which 11 is the felly and 12 the pneumatic tire. It is common practice for such tires to travel over the roads of the country with bare surfaces which exposes them to more or less injury from glass, sharp stones and other obstructions in the roads and from the cutting action of ice in winter. The life of a tire is for this reason shorter than would be the case were the same provided with a protective covering of metal that would be light, strong and have sufficient flexibility demanded and which would not rattle or be noisy during the running of the automobile.

To overcome the objections above noted and provide means for increasing the life of a tire there is provided in the present invention a plurality of pairs of tread plates 13 and 14 adapted to be placed transversely around the tread 12 of an automobile tire and connected together in pairs in the center or tread line of the tire by a hinge pin 15. Each tread plate is made from a blank of thin resilient sheet metal, as shown in Fig. 4, preferably steel, and having one or more lugs 16 projecting from opposite ends as shown. Each blank is made slightly wider at one end 17 than at the other end 18, the sides of the blank tapering from the former to the latter end at such an angle that when applied to the tire the edges of successive pairs of tread plates will be substantially parallel as shown in Fig. 1, with a relatively narrow space therebetween, said spaces being radially disposed as shown. The hinge pins 15 joining pairs of tire plates 13 and 14 are each as long as the width of said plates and are headed on each end to maintain the same in place, the lugs 16 being folded around said pin and their ends pressed against the under side of the plate to form hinge members. As shown in Fig. 3 of the drawing, each alternate tread plate 13 is provided on its edge 17 with a removable lug 16, the intermediate plates 13 having two end lugs 19. Like edges of the tread plates 14 are similarly formed alternately with a single lug and with two lugs. These lugs 16 and 19 on both series of plates 13 and 14 are turned inwardly under the plates from which they project to form hinge members and by means of these hinge members and the pins 15, the tread plates 13 and 14 are connected together in pairs and so are enabled to embrace transversely the outer circumference of the tire 12. The hinge connection between each pair of plates 13 and 14 is as long as the plates are wide owing to the fact that the lug 16 and the two lugs 19 which form the hinge member each have a width equal to one third the length of the edge 17 of said plates. The single lugs 16 are formed alternately on the plates 13 and 14 in order to distribute evenly around the tire the inwardly folded ends of said lugs so as to distribute equally the pressure of said lugs upon the surface of the tire.

The free outer ends of the tread plates 13 and 14 are hinged on each side of the tire to shield plates 20 of an arcuate form, concentric to the center of the wheel and which lie flat against the sides of the tire. The length of the sections 20 may be determined by various conditions as there may be four, six or eight such sections connected endwise to complete the circle of the tire. In the drawings, the length of the sections are such that six of them connected endwise form a circular shield or protector for one side of the tire. Projecting radially from the outer or convex edge of each shield plate 20 are a number of tongues 22 which are folded over a curved wire 21 at the edge of the plate. Lugs 16 on the outer ends of a series of tread plates 13 are folded around the wire 21 and so form hinge connections between these tread plates and one of the shield plates 20. Similar lugs 16 on the corresponding tread plates 14 are connected to another shield plate 20 in like manner which when in position will bear against the opposite side of the tire 12, the arrangement being clearly shown in Fig. 2 of the drawings. Each shield plate 20 has its inner concave edge folded about a wire or rod 23, the ends of which project a short distance beyond the ends of the shield plate and are threaded as shown.

The tire protector or shield as a whole is formed of a plurality of flexibly connected members preferably six but a greater or less number may be employed when desired, the number of members depending on the number of shield plates 20 on each side of the tire. As shown in Fig. 1 each member consists of two shield members 20 seven tread plates 13 and an equal number of tread plates 14 hinged together as described, that is to say, the plates 13 and 14 are pivoted together in pairs at one end of each plate at the tread line of the tire and at their opposite ends are hinged to the convex edges of the two side shield plates 20.

From the above it is readily apparent that each protector member has great flexibility due to the fact that the plates are hinged together in pairs and to the shield plates by circumferential pivots and each pair of said tread plates being disconnected from the adjacent pairs so that each pair when pressure is brought to bear thereupon may move independently of the pair in front or in rear.

The shield plates 20 are connected together endwise on each side of the tire 12 by turn buckles 24 threaded on the ends of the wires 23 that project beyond the ends of adjacent shield plates 20, the threaded ends of the wires being one right handed and the other left handed as is usual in order to draw the wires together or to separate them when said turn buckle is turned in one direction or the other. In order to permit the ends of adjacent tread plates 20 to approach close together and in contact if necessary their inner or concave edges are cut away as shown at 25 to provide recesses for the reception of the turn buckles while the ends of the plates are being drawn together.

In use, if the tire on which the shield is to be used be of less than standard diameter, the ends of the shield plates 20 may be drawn so closely together by the turn-buckles as to contact and the space between adjacent edges of pairs of plates 13 and 14 of successive protecting shield members be but slightly separated, as at the right of Fig. 1, while on a larger tire this space may be so great that a filler or pair of narrow plates 26 and 27 hinged together as at 28, Fig. 3, will be required to fill the space. The ends 29 of the plates 26 and 27 are hinged each to a small plate 30 the free end of which is folded about the turn buckle 24 and serves the double purpose of holding the filling sections 26 and 27 in place and preventing rotation of the turn buckle.

When desired, or in case of an emergency which might arise, as for instance when the adjoining shield plates 20 fail to come together sufficiently close to use the turn buckle, as shown in Fig. 5, these ends may be connected together by a band or strip of malleable metal 31 the ends of which are inserted inwardly through slots 32 in the ends of said plates 20 and bent back upon themselves. If on the other hand the tread plates be drawn too close for the insertion between sections of the filling plates 26 and 27, but sufficiently close for the use of a turn buckle on the ends of the wires 23, this turn buckle may be held against rotation by fastening a second strip 33 around the band 31 and the turn buckle 30 as clearly shown in Fig. 6. Preferably the outer surfaces of the plates 13 and 14 are provided with a plurality of projections 34 which may be in the shape of a star as shown or of any other configuration, these projections are provided for the purpose of increasing the nonskid properties of the protecting shield.

An important advantage in connection with the present invention is the readiness with which repairs may be made in case any of the plates should be bent or broken by accident or otherwise, or in any other manner be rendered inoperative. This is accomplished by removing the pivots that connect the defective plates, unclasping them from the protector and inserting new plates in lieu thereof. These additional plates may also be carried in reserve on the car as they are of such a nature that a large number will make a relatively small package which may be stored almost any place on the car.

I claim—

1. The herein described tire shield made up of a series of pairs of tread plates hinged to each other end to end at the transverse center of the tread of the wheel and having tongues at their outer ends; two annular shield plates lying against the sides of the tire and each made up of a plurality of sections end to end with longitudinal wires connecting the sections at both edges, the ends of said tread plates being hingedly mounted on the wires along the outer edges of said shield plates.

2. In a tire shield, the combination with a series of tread plates hinged together end to end in pairs and lying side by side across the tread of the tire, and a pair of filler plates similarly hinged together and having small pliable plates hinged to their outer extremities; of annular shield plates made in section lying against the sides of the tire, wires strung through said sections for connecting them with each other and for hingedly connecting the shield plates with the outer ends of the tread plates, and means opposite said pliable plates on the fillers for drawing the ends of said wires toward each other, for the purpose set forth.

In testimony whereof I affix my signature in presence of two witnesses.

WESLEY E. WENNER.

Witnesses:
 Geo. H. Leh,
 Russell J. Buzzard.